Patented July 14, 1953

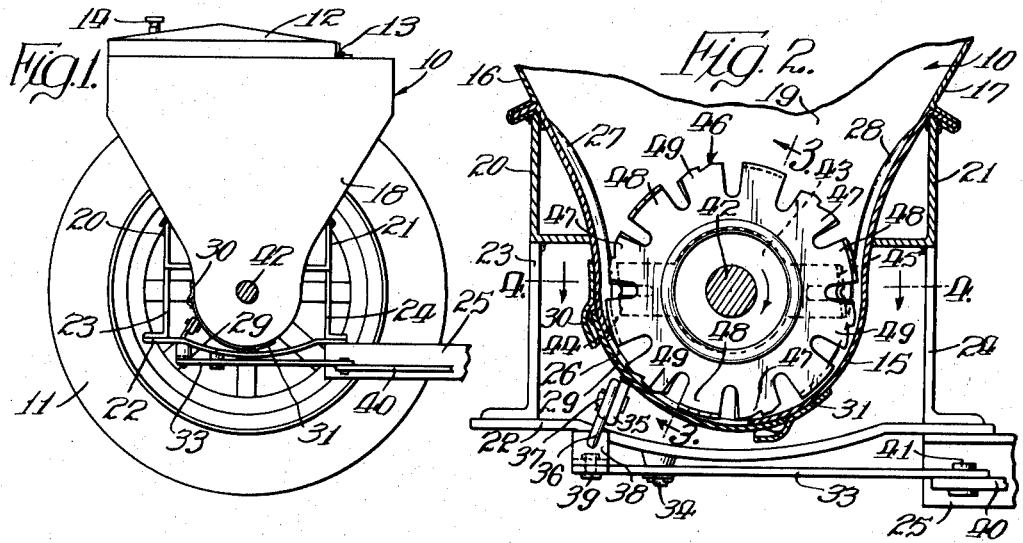

2,645,384

UNITED STATES PATENT OFFICE 2,645,384

MATERIAL SPREADING APPARATUS

Edmond A. Juzwiak and Fortunato S. Ajero, Chicago, Ill., assignors, by mesne assignments, to Avco Manufacturing Corporation, New York, N. Y., a corporation of Delaware Application May 15, 1950, Serial No. 162,000

15 Claims. (Cl. 222—240)

Our invention relates generally to material spreading apparatus such as the type used to spread or sow fertilizer and other fluent solid chemicals, grains, grasses, legumes, and like material. More particularly our invention relates to improvements in apparatus of the type shown and described in the patent application of Edmond A. Juzwiak, Serial No. 90,086, filed April 25, 1949, now Patent No. 2,510,231, and entitled Spreader.

Materials such as superphosphate fertilizer, wet, green or improperly cured fertilizer, or old fertilizer which has set up and become lumpy and hard present a considerable problem from the viewpoint of dispensing them at small rates, such as for example forty or fifty pounds of material per acre. This problem arises because of the tendency of such material to stratify and form into hard, almost rock-like lumps and agglomerations, and especially because of the tendency of said materials to stratify and harden at and near the discharge port or valve of the spreader apparatus.

It is therefore an important object of our invention to provide material dispensing apparatus which insures a positive feed of material from the discharge ports regardless of the size of the discharge area of each port.

Another object of our invention is to provide apparatus which minimizes stratification within the hopper of the apparatus, and especially at and adjacent to the feed mechanism therein.

Another object is to provide apparatus of simple, rugged construction, but which nevertheless provides for fine adjustment of the quantity of material which is dispensed therefrom.

In its broad aspect, our material spreader comprises a hopper having a shuttered discharge port therein, two opposite sides of said port being substantially parallel, a rotatable material feeder disk in said hopper including a plurality of arms extending laterally of the median plane of the disk, some of the arms extending on one side of said median plane and the remaining arms extending on the other side of said plane, each of said arms including one or more teeth in the projecting end thereof, said arms positioned to penetrate into said discharge port as said disk rotates and to move closely adjacent to their corresponding side of said port. In preferred embodiments of our invention, the arms extend alternately in opposite directions from the median plane of said disk, while in addition material charging vanes are positioned intermediate said arms so that as the disk rotates the port is first charged with material by one of the vanes, following which an arm penetrates into said port to force at least a portion of said material from the hopper.

Other embodiments of our invention include two grooves which extend from opposite ends of each of said discharge ports, and of substantially the same width as said discharge ports, while the aforesaid material feeding member is positioned such that the arms sweep through at least portions of each of said grooves as said disk rotates. A further refinement of our invention places the discharge ports on that side of the vertical center line of the shaft or member on which the disks turn, in which the arms are moving in a generally upward direction as the disks turn.

Apparatus conforming to our invention advantageously is characterized by the following operating features: (1) The entire port and the grooves extending therefrom are swept out one or more times in each revolution of the material feeder disk, which acts to prevent stratification of material in the discharge port and also to minimize stratification at the walls of the hopper adjacent to the path of the rotating disk. (2) The flow of material from the discharge port is positive and steady, regardless of the size of the effective discharge area of each of said ports. (3) The apparatus provides for a highly efficient flow of material into and through the discharge ports, in which the port is first charged with a predetermined quantity of material, following which a measured portion of this quantity is driven through the open port. (4) The discharge ports are positioned at a point in the hopper bottom at which the pressure exerted on the material by the feed mechanism is at a minimum, thereby further reducing the tendency of the material to stratify at the point of discharge.

In order that our invention may be more fully disclosed, reference is had to the accompanying drawing which illustrates one form of apparatus embodying the foregoing and such other principles, advantages or capabilities as may be pointed out as this description proceeds, or as are inherent in the present invention. For purposes of clarity in exposition, the following description is explicit, and the accompanying drawing is detailed, but it is distinctly to be understood that said exposition is illustrative only, and that our invention is not restricted to the particular details recited in the specification or shown in the drawing.

In the drawing:

Figure 1 is a fragmentary side elevational view of material spreading apparatus embodying our invention;

Figure 2 is an enlarged, fragmentary side view taken in section to show the interior arrangement of the embodiment of Figure 1.

Figure 3 is a fragmentary front view taken in section on the line 3—3 of Figure 2, with a portion of the feeder mechanism shown in elevation;

Figure 4 is a fragmentary plan view taken in section on the line 4—4 of Figure 2, a portion of the feeder mechanism being shown in elevation; and Figure 5 is a fragmentary bottom view showing the details of the shutter used to adjust the amount of material dispensed from our apparatus.

Like reference characters designate like parts in the drawing and in the description of our invention which follows hereafter.

Turning now to the drawing, and more particularly to Figure 1 thereof, our material spreading apparatus includes a hopper 10 supported by a pair of rubber tired wheels 11, only one of which is shown. A lid 12 is secured to the top of the hopper 10 by the hinge 13, and is opened and closed by means of the handle 14, whereby material is loaded into the hopper 10. Referring now to Figure 2, in conjunction with Figure 1, the hopper 10 includes an arcuate bottom plate 15, two divergently extending side plates 16 and 17, and two end plates 18 and 19. The side plates 16 and 17 are seamed to the bottom plate 15, while the assembly is stiffened by means of two transverse bracket members 20 and 21. A bridge member 22 extends beneath the bottom plate 15, and is supported in this position by the two angle irons 23 and 24 extending beneath the bracket members 20 and 21. A drawbar 25 is connected to one end of the bridge member 22, and provides means for coupling the spreader to a tractor or other prime mover.

As best shown in Figures 2 and 4, the bottom plate 15 includes a plurality of substantially rectangular shaped discharge ports 26 therein. A groove 27 extends from one end of each of the discharge ports 26, while a second groove 28 extends from the opposite end of each of said ports 26. As best shown in Figure 2 below the line 4—4, the depth of each groove decreases as the groove approaches the port. The grooves are inwardly concave and follow the arcuate shape of the bottom plate. They have substantially uniform width. A shutter plate 29 is slidable beneath that portion of the bottom plate 15 having the discharge ports 26 therein, two sets of spring tongues 30 and 31 holding the shutter plate 29 in place. The shutter plate 29 is provided with a plurality of substantially triangular shaped apertures 32, which are registrable with the discharge ports 26 in varying degree, upon movement of the shutter plate 29 laterally of the bottom plate 15. The shutter plate 29 may be positioned relative to the bottom plate 15 using any one of a number of types of actuating linkage. In Figure 2 this linkage is illustrated as including a bell crank 33 turnable on the pintle 34 extending beneath the bridge member 22. A block 35 is secured to the shutter plate 29, and is drivably connected to the bell crank 33 through the link 36, a pin 37 connecting one end of the link 36 to the block 35, while the other end of the link 36 is pivotally connected to the bell crank 33 through the member 38 and the pin 39. An actuating lever 40 is connected to the bell crank 33 by the coupling pin 41.

As the wheels 11, 11 of the hopper 10 turn, they drive a rotatable shaft 42 in the interior of said hopper 10. Secured to the shaft 42 intermediate the discharge ports 26, are a plurality of staggered agitator members 43 each of which includes oppositely extending arms 44 and 45 which sweep close to the bottom plate 15 as the shaft 42 turns. Also secured to the shaft 42 are a plurality of feeder disks 46. The feeder disks 46 are arranged on the shaft 42 so that the median plane of each substantially bisects its respective discharge port 26. Extending radially from each of the feeder disks 46 are a plurality of vanes 47 and feeder members 48. The vanes 47 and members 48 each penetrate into the discharge ports 26 as the shaft 42 turns, and are arranged alternately so that as each vane 47 moves through its respective port 26, it is followed by a feeder member 48.

As best shown in Figure 2, alternating charging vanes 47 are skewed oppositely from the median plane of the disk 46, and are angled so as to load material into the discharge ports 26 as the disks 46 rotate in a clockwise direction, as viewed in Figure 2. Each of the vanes 47 includes a pair of teeth 49 in the peripheral edge thereof, the leading edge of each of the teeth 49 being disposed substantially radially of the shaft 42.

Each of the feeder members 48 includes a laterally extending arm 50 the outer end of which includes two teeth 51 and the leading edges of which are substantially perpendicular to the direction in which the feeder members 48 move as the shaft 42 turns. The arms 50 of alternating feeder members 48 extend laterally on opposite sides of the median planes of the disks 46, and move closely adjacent to the sides of their respective discharge port 26.

In using our novel apparatus, the hopper 10 is first filled with the material to be dispensed, and the spreader pulled to the place where the material is to be spread or sown, at which place the operator moves the shutter plate 29 to obtain the desired rate of flow of material from the ports 26. As the wheels 11 turn, they drive the shaft 42, on which the agitator members 43 and feeder disks 46 are mounted. The agitator members 43 break up and mix the material and drive it toward the feeder disks 46. As the material moves laterally along the shaft 42, the vanes 47 of the rotating disks 46 scoop out a portion of the material and drive it into the opening areas of ports 26. As each vane 47 thus charges its respective port 26 with material, it simultaneously agitates said material by reason of the fact that it penetrates into said entire port 26. The moving vanes 47 are immediately followed by rigid feeder members 48, which extend from the median plane to the sides of the discharge ports 26, which enter the discharge ports 26 and drive material therein through the apertures 32 in the shutter plate 29.

As best shown in Figure 5, the teeth 51 of the feeder member arms 50 move closely adjacent to the sides of the discharge ports 26. Thus, no material can build up and stratify within the discharge ports 26, since in the embodiment shown the port is cleaned several times during each complete revolution of the shaft 42. While Figure 5 shows the shutter plate 29 in the position in which the effective discharge area of the ports 26 is at a maximum, the apparatus is just as effective in providing a steady flow of material from the ports 26 when the shutter plate 29 is in the position shown in Figure 4. In this case the left hand feeder member arms 50 assume the entire function of forcing the material through the apertures 32; however the right hand arms 50 serve the useful function of preventing stratification within its portion of the discharge ports 26. Otherwise at the smaller rates of feed stratification phenomena would tend to build up material in the right hand portion of each port 26, from which it could radiate to interfere with the efficient distribution of material.

Advantageously, our apparatus acts to prevent stratification of material along the sides of the bottom plate 15, and especially between the agitator members 43 and the feeder disks 46. In the case where the bottom plate 15 is straight sided, there is a tendency for the material to stratify at the point where the particular feeder disks used sweep close to said bottom plate 15. Without limiting ourselves to any theory of operation, it appears that this phenomenon results from the pressure which the rotating disks exert on the material at this point. Also, apparently stratification initially is concentrated only immediately adjacent to the rotating disks; however this initial stratification serves as a focal point from which stratification quickly radiates. We have discovered, however, that this objectionable stratification can be substantially eliminated by confining the disks 46 to operate within the grooves 27 and 28, as shown in the drawing. While as before the tips of the feeder member arms 50 exert pressure on the material within the hopper 10 as the shaft 42 turns, the focal point or line of stratification is confined to the corners of the grooves 27 and 28. As the feeder member 48 turns, the teeth 51 continually agitate and break up any stratification before it can spread. This would explain the fact that a minimum of stratification occurs within the hopper 10, even though the material being dispensed is as cohesive and tenacious as superphosphate fertilizer.

In addition, our construction acts to minimize the pressure exerted on the material while in the ports 26, and thereby makes easier and thus more effective the action of the vanes 47 and feeder members 48 in preventing stratification at these points. More particularly, in our apparatus the discharge ports 26 are shifted to one side of the bottom of the bottom plate 15, rather than being centered therein as is conventional practice. As the feeder disks 46 turn, the material to the right of the vertical center line of the shaft 42 (Figure 2) is under considerably more pressure than is the material to the left of the vertical center line. This arises because of the tendency of the feeder disks 46 to drive material into a progressively smaller, confined area as the vanes 47 and feeder members 48 move through the lower right hand quadrant. As the vanes 47 and feeder members 48 move past the vertical center line and into the lower left hand quadrant however, the material is driven into a progressively expanding area; hence the pressure at this side is relieved. In our construction, therefore, the material in discharge ports 26 is under considerably lower pressure than is the case if they were to be located in a conventional manner, i. e. centered in the bottom plate 15. While the vanes 47 and feeder members 48 would effectively clear the discharge ports 26 of stratification, regardless of their position in the bottom plate 15, by minimizing the pressure at the discharge ports 26 the feed is more uniform, and the bending forces on the shaft 42 are reduced.

In practice, we prefer to form the agitator members 43 and the feeder disks 46 of a rigid, non-deformable material such as case hardened or heat treated steel. While we do not wish to be limited to any specific clearance between the teeth 51 and the sides of the discharge ports 26, such clearance preferably is no more than $\frac{3}{16}$ of an inch, and experience indicates that the less the clearance the more effective is the operation of the apparatus. In addition, we prefer that the arms 59 be in virtually scraping contact with the shutter plates 29, so as to give the maximum penetration of the discharge ports 26. In actual operation, however, slight variances will occur, due principally to manufacturing tolerances.

Having thus fully disclosed our novel material spreader apparatus, and demonstrated its utility by reference to a specific embodiment thereof, we claim as our invention:

1. A material spreader, comprising: a hopper having a substantially rectangular discharge port therein, a shutter movable relative to said discharge port to close it off in varying degrees, a rotatable shaft in said hopper, means for rotating said shaft normally in one direction, and a rigid metallic disk-shaped member positioned on said shaft so that the median plane thereof substantially bisects said discharge port between two opposite sides thereof, said member including a plurality of arms extending laterally thereof, alternate arms extending on opposite sides of said median plane and each including a plurality of teeth in the projecting end portion thereof, the leading edge of each of said teeth being substantially perpendicular to the direction in which said end portion moves as said member rotates, said arms further positioned to penetrate into said discharge port as said member rotates and to approach to within less than $\frac{3}{16}$ inch of said opposite sides of said port.

2. A material spreader, comprising: a hopper having a substantially rectangular discharge port therein, a shutter movable relative to said discharge port to close it off in varying degrees, a rotatable shaft in said hopper, means for rotating said shaft normally in one direction, and a rigid disk-shaped member on said shaft including a plurality of arms extending laterally of said member, alternate arms extending on opposite sides of the median plane of said member and each including a plurality of teeth in the projecting end portion thereof, the leading edge of each of said teeth being substantially perpendicular to the direction in which said end portion moves as said member rotates, said arms positioned to penetrate into said discharge port as said member rotates and to approach to within less than $\frac{3}{16}$ inch of opposite sides of said port.

3. A material spreader, comprising: a hopper having a substantially rectangular discharge port therein, a shutter movable relative to said discharge port to close it off in varying degrees, a rotatable shaft in said hopper, means for rotating said shaft, and a disk-shaped member on said shaft including a plurality of arms extending laterally of said member, alternate arms extending on opposite sides of said member and each including one or more teeth in the projecting end thereof, said arms positioned to penetrate into said discharge port as said member rotates and to move closely adjacent to the sides of said port.

4. A material spreader, comprising: a hopper having a discharge port therein two opposite sides of which are substantially parallel, a shutter movable relative to said discharge port to close it off in varying degrees, and a rotatable disk-shaped member in said hopper aligned with said discharge port for rotation about an axis substantially perpendicular to said parallel sides of said port, said member including a plurality of arms extending laterally of the median plane of said member, some of the arms extending to one side of said plane, the remainder extending to the other side of said plane, said arms positioned to penetrate into said port as said member rotates and to move closely adjacent to their corresponding sides of said port.

5. The combination with a material spreader having a discharge port therein at least one side of which is substantially straight, a shutter movable relative to said discharge port to close it off in varying degrees, and means to charge said discharge port with material, of a generally disk-shaped member aligned with said discharge port and rotatable in a plane parallel with said straight side and laterally spaced from said straight side, said member including one or more arms extending laterally thereof away from said plane substantially to said straight side and positioned to penetrate as said member rotates.

6. The combination with a material spreader having a discharge port therein at least one side of which is substantially straight and means to charge said discharge port with material, of a rigid member positioned in said spreader for movement in a recurring cycle in a plane spaced from and parallel to said straight side of said port, and at least one arm on said member extending laterally therefrom toward said side and positioned to penetrate into said port and to move closely adjacent to said straight side of said port during movement of said member, and means constraining said member to move in said recurring cycle.

7. The combination with a material spreader having a discharge port therein, at least one side of which is substantially straight, of a rigid member positioned in said spreader for movement in a recurring cycle parallel to said straight side of said port, said member including an arm extending laterally therefrom and positioned to move closely adjacent to said straight side of said port during movement of said member, and means constraining said member to move in said recurring cycle, the projecting end of said arm including one or more teeth the leading edges of which are substantially perpendicular to said straight side of said port as said arm moves therethrough.

8. A material spreader, comprising: a hopper having a substantially rectangular discharge port therein, a shutter plate movable relative to said discharge port to close it off in varying degrees, a rotatable shaft in said hopper, means for rotating said shaft normally in one direction, and a disk positioned on said shaft with the median plane thereof substantially intermediate two sides of said discharge port, said disk including charging vanes and discharge members extending alternately from the body of the disk and positioned to extend into said discharge port as said disk rotates, alternating charging vanes skewed from the median plane and alternately to opposite sides thereof of said disk to load said discharge port with material as said disk rotates in said one direction, each of said charging vanes including a plurality of teeth in the projecting end portion thereof with the leading edges thereof disposed substantially radially of said shaft, alternating discharge members extending laterally of the median plane of said disk and each including a plurality of teeth in the projecting end portion thereof, the leading edges of which are substantially perpendicular to the direction in which said end portion is moving as said disk rotates, said teeth moving within less than $\tfrac{3}{16}$ inch of the sides of said port as said disk rotates, whereby material in said port is forced therethrough.

9. A material spreader, comprising: a hopper having a substantially rectangular discharge port therein, a shutter movable relative to said discharge port to close it off in varying degrees, a rotatable shaft in said hopper, means for rotating said shaft, and a disk on said shaft, said disk including charging vanes and discharge members extending alternately from the body of the disk, alternating charging vanes skewed from the median plane of said disk to load material into said discharge port as said disk rotates, alternating discharge members extending laterally on opposite sides of the median plane of said disk and each including one or more teeth in the projecting end thereof, said members positioned to penetrate into said discharge port as said disk rotates and to move closely adjacent to the sides of said port, whereby material in said port is forced therethrough.

10. The combination with a material spreader having a discharge port therein at least one side of which is substantially straight, and a shutter movable relative to said discharge port to close it off in varying degrees, of a rotatable member in said hopper laterally spaced from said side but aligned with said discharge port for rotation about an axis substantially perpendicular to said straight side of said discharge port, said member including means for forcibly charging the open area of said discharge port with a quantity of material within said hopper, said member further including an arm extending laterally thereof and positioned to penetrate into said discharge port after said port has been charged with material, an end of said arm being further positioned to move closely adjacent to said straight side of said discharge port as said member rotates.

11. The combination with a material spreader having a discharge port therein at least one side of which is substantially straight, of means for forcibly charging said discharge port with a quantity of material, a rigid, substantially non-deformable member positioned in said spreader for movement in a recurring cycle parallel to but spaced from said straight side of said port, said member including an arm extending laterally therefrom toward one side and positioned to penetrate into said discharge port with the free end of said member closely adjacent to said straight side of said port during movement of said member, and means constraining said charging means and said member to alternately (a) charge said discharge port with material and (b) drive a portion of said material through said port.

12. A material spreader, comprising: a hopper including a semi-cylindrical bottom plate, said bottom plate having a substantially rectangular discharge port therein and two grooves of substantially the same width as said port extending from the two opposite ends of said port, the depth of said grooves decreasing as they approach said port, a shutter movable relative to said discharge port to close it off in varying degrees, a rotatable shaft in said hopper, means for rotating said shaft, and a disk on said shaft including a plurality of arms extending laterally of the disk, alternate arms extending on opposite sides of said disk and each including one or more teeth in the projecting end thereof, said arms positioned to penetrate into said discharge port closely adjacent to the sides thereof, and to sweep through said grooves closely adjacent to the sides thereof.

13. A material spreader comprising: a hopper including an arcuate bottom plate having an arcuate, inwardly concave groove of substantially uniform width therein, said groove having a discharge port therein intermediate the two ends thereof, a rigid member positioned in said hopper for movement in a recurring cycle parallel with the arcuate extension of said groove, said member including a plurality of arms laterally extending therefrom to closely adjacent the sides of said groove and positioned to penetrate the discharge port therein during movement of said member, and means constraining said member to move in said recurring cycle.

14. A material spreader, comprising: a hopper, a rotatable shaft therein, means for rotating said shaft normally in one direction, a semi-cylindrical bottom plate in said hopper having a discharge port therein two opposite sides of which are parallel, a disk-shaped member positioned on said shaft in alignment of said discharge port, said port offset to that side of said bottom plate up which said member moves as it rotates, said bottom plate further having two grooves therein extending from opposite ends of said port in alignment with the plane of rotation of said member, said member including a plurality of toothed elements which penetrate into said port and said grooves closely adjacent the sides thereof as said member rotates, and a shutter exterior of said bottom plate and slidable relative to said discharge port to close it off in varying degrees.

15. In a material spreader of the character described including a hopper having a discharge port, a rotatable shaft, means for closing said port and means for rotating said shaft: a disk-shaped member on said shaft including a plurality of arms extending laterally of the member, alternate arms extending on opposite sides of said member and each including one or more teeth in the projecting end thereof, said arms positioned to penetrate into said discharge port as said member rotates and to move closely adjacent to the sides of said port.

EDMOND A. JUZWIAK.
FORTUNATO S. AJERO.

References Cited in the file of this patent

UNITED STATES PATENTS

| Number | Name | Date |
|---|---|---|
| 1,733,722 | Cotner | Oct. 29, 1929 |
| 2,143,801 | Self | Jan. 10, 1939 |
| 2,174,138 | Sage | Sept. 26, 1939 |
| 2,510,231 | Juzwiak | June 6, 1950 |